United States Patent [19]

Riche

[11] Patent Number: 5,584,305
[45] Date of Patent: Dec. 17, 1996

[54] PERFORMANCE METER TAKING INTO ACCOUNT TRIP PARAMETERS

[76] Inventor: Raymond Riche, 7, Rue Eugène Ravanat, 38320 Eybens, France

[21] Appl. No.: 366,299

[22] Filed: Dec. 29, 1994

[30] Foreign Application Priority Data

Dec. 30, 1993 [FR] France .................. 93 16030

[51] Int. Cl.$^6$ ................................. A63B 21/00
[52] U.S. Cl. ................ 128/898; 128/687; 422/8; 422/901
[58] Field of Search ............... 364/413.02–413.04, 364/413.27; 128/687–691, 897, 898; 601/23, 33, 36; 482/1–9, 52, 54, 57–65, 72, 74, 900, 902

[56] References Cited

U.S. PATENT DOCUMENTS

| | | | |
|---|---|---|---|
| 4,408,183 | 10/1983 | Wills | 482/3 X |
| 4,443,008 | 4/1984 | Shimano . | |
| 5,240,417 | 8/1993 | Smithson et al. | 482/57 X |
| 5,335,188 | 8/1994 | Brisson | 482/8 X |
| 5,478,295 | 12/1995 | Fracchia | 482/5 X |

FOREIGN PATENT DOCUMENTS

| | | |
|---|---|---|
| 2532854 | 9/1982 | France . |
| 9007313.4 | 1/1991 | Germany . |
| 60-120208 | 6/1985 | Japan . |

*Primary Examiner*—Angela D. Sykes
*Assistant Examiner*—Samuel Gilbert
*Attorney, Agent, or Firm*—Lowe, Price, LeBlanc & Becker

[57] ABSTRACT

A meter measuring the speed of a person moving using his muscular energy includes apparatus for providing speed data; meters for measuring, directly or indirectly, at least one parameter affecting the effort to make to obtain motion; and processors, taking into account coefficients associated with the value of the parameter and with the morphology of the person, for providing data of equivalent speed corresponding to the speed value that would be reached for the same effort when the considered parameter has its rest value.

13 Claims, 2 Drawing Sheets

PERFORMANCE METER TAKING INTO ACCOUNT TRIP PARAMETERS

BACKGROUND OF THE INVENTION

1. Field of the Invention

The present invention relates to performance meters, more particularly for measuring speed and distance, for a person moving under his muscular energy.

The present invention will be disclosed hereinafter with relation to a bicycle but the invention applies to any other device driven by muscular energy, for example a rowing boat, or to the motion of walkers or runners using a pedometer.

2. Discussion of the Related Art

In the prior art, electronic meters, and more particularly bicycle meters, have been developed about microprocessors and memories, including means for measuring the distance and time, and providing from these data various values such as ride time, trip distance, cumulated distance, average speed, maximum speed, and so on. Some of these meters are also associated with altitude sensors, from which cumulated values of positive or negative altitude differences (ascending or descending slope) are provided, with sensors that measure the heart rate of the cyclist, with power or torque meters...

The hardware and software means of such meters for measuring, calculating, programming, memorizing and displaying are considered as being known.

SUMMARY OF THE INVENTION

An object of the present invention is to fabricate a meter which, in addition to the above-mentioned measuring, calculating and displaying, generally detects at least one external parameter related to the trip conditions. This parameter is, for example, the altitude difference, the wind, a braking, and also rain, a pause, a particular aspect of the trip, and so on. This detection is used to provide, as a function of this parameter, the speed and/or the distance that the cyclist would have covered if this parameter were at its rest value.

The present invention more particularly applies to cyclists. The cyclists know that if they desire to perform a trip lasting several hours, they must manage their forces so that they make a substantially constant effort. This effort corresponds to a determined mean speed $v_{mp}$ on flat land and in the absence of wind, this speed being, for example, 30 km/h. Thus, a cyclist using a conventional speedometer tries to maintain his speed around 30 km/h in order to perform the trip under the best conditions, i.e., not too slow, and not too fast in order to spare his energy. But, when the conditions of the trip are different from those encountered on flat land and in the absence of wind, for the same effort, the speed is modified. The cyclist knows that, if he is climbing a slope, he must ride slower than on flat land to spare his energy. In this case, the cyclist has no indication on the speed that he should reach to operate with a constant effort and his own feeling of effort is subjective and misleading, and often occurs with some delay.

The same happens if the cyclist is confronted to a front wind or a back wind or if other external parameters vary. For example, he must make a bigger effort when he brakes because he must thereafter catch up his speed, when the road is very bumpy, if he is alone or in a group, etc. Also, the cyclist's efforts may vary with temperature.

Thus, the present invention provides a meter for indicating to a cyclist, in the presence of a parameter specific to the conditions of the portion of the trip he is running, the equivalent speed he would reach making a constant effort if the considered parameter were at its rest value (a zero slope for the slope parameter, an absence of wind for the wind parameter, the absence of braking for the braking parameter).

The present invention also provides a method and a meter allowing a cyclist to determine beforehand or afterwards the equivalent distance on flat land of a determined trip. Since the cyclist knows his average speed on flat, he can determine beforehand the time that a trip will last and determine afterwards the equivalent distance he would have run if the distance covered were on flat and under ideal conditions.

The present invention is based on the study of the influence of these external parameters and on the variations in speed they cause for a constant effort of the cyclist.

As will be seen in more detail hereafter, especially in an exemplary analysis of the influence of the slope, it will be clear that each parameter requires a specific study because their influence is generally not linear: for a determined cyclist, the variation of the speed is not proportional to the slope. Moreover, the effects of these parameters are specific to a cyclist or to a type of cyclist: two cyclists having the same average speed during a flat trip will not make the same effort to climb a given slope. Efforts vary depending on the cyclist's morphology, his weight, his training, his technical level. An aspect of the invention is to provide a meter supplying data of equivalent speed and distance that takes into account specific characteristics of a cyclist.

Thus, the present invention generally provides method for measuring and managing the efforts of a person moving under his muscular energy, this displacement being affected by various parameters, including the steps of establishing for each parameter a correspondence table between the instant speed of the displacement and the equivalent speed that would be reached if the parameter was at its rest value and for the same effort; and providing for each instant speed the corresponding equivalent speed.

According to an embodiment of the invention, the table corresponds to a proportion coefficient.

The present invention also provides a meter for a person moving under his energy. The meter includes means for measuring data characterizing the movement; means for measuring, directly or indirectly, at least one parameter affecting the effort to make to obtain motion; means for providing coefficients associated with the value of the parameter; and means, taking into account the coefficients for providing a performance indication corresponding to the value that would be reached by the characterizing data for the same effort when the considered parameter has its rest value.

According to an embodiment of the invention, the coefficients are also specific to the person.

According to an embodiment of the invention, the characterizing data is the speed and the performance is an equivalent speed.

According to an embodiment of the invention, the meter includes means for introducing normal average speed for rest values of at least one parameter; means for storing and/or calculating coefficient tables as a function of variations of the parameter; and means for calculating the equivalent speed taking in account the coefficient tables.

According to an embodiment of the invention, the meter is associated with a bicycle.

According to an embodiment of the invention, the considered parameter is the difference of altitude, and the equivalent speed is determined by the relation:

$$v_{ie}=v_i(1+k_m p) \text{ or } v_{ie}=v_i(1-k_d p),$$

where $v_{ie}$ is the equivalent instant speed, $v_i$ is the instant speed, p is the slope, $k_m$ is a coefficient depending upon the slope and the cyclist for a positive slope, $k_d$ is a coefficient depending upon the slope and the cyclist for a negative slope.

According to an embodiment of the invention, the meter includes means for calculating a performance index which is a function of the equivalent instant speed and the average speed on flat.

According to an embodiment of the invention, the meter is associated with a sensor for measuring the cyclist's heart rate and includes means for calculating and displaying a fitness index F calculated as a function of the equivalent instant speed and of the detected heart rate, for example:

$$F=v_{ie}N_0/v_{mp}N_i, \text{ where:}$$

$v_{ie}$ is the equivalent instant speed, $v_{mp}$ is the average speed on flat, $N_0$ is the cyclist's heart rate for a normal effort during a flat portion of the trip, and $N_i$ is the detected heart rate.

According to an embodiment of the invention, the meter includes means for indicating whether the fitness index or the performance index is higher or lower than 1.

According to an embodiment of the invention, the meter includes means for inhibiting the slope value when the slope difference, during a determined time interval, does not exceed a predetermined threshold.

According to an embodiment of the invention, the parameter is the slope and the meter further comprises means for inhibiting the effect of altitude variations when those variations provide slope values that are not compatible with the person's speed and coefficients.

According to an embodiment of the invention, the parameter is wind and the equivalent instant speed is determined by the equation:

$$v_{ie}=v_{mp}\pm V_t^x$$

where $v_{ie}$ is equivalent instant speed, $v_{mp}$ is the average speed on flat, without wind, x is a coefficient associated with the person, $V_t$ is the speed of wind.

According to an embodiment of the invention, the meter includes means for calculating the average value of the equivalent speed and the equivalent distance that is covered.

According to an embodiment of the invention, the meter includes means for indicating the advised gear and the optimum rate. Preferably, the meter is associated with an electrically-controlled gear changing device, and the values of the considered parameters are used for automatically controlling the gear changes.

According to an embodiment of the invention, the meter includes at least one control system that can be activated by the cyclist to store, at specific points of the run, data such as the run distance, the altitude and the time.

The foregoing and other objects, features, aspects and advantages of the invention will become apparent from the following detailed description of the present invention when taken in conjunction with the accompanying drawings.

DETAILED DESCRIPTION

1. Difference of Altitude

Figure 1:
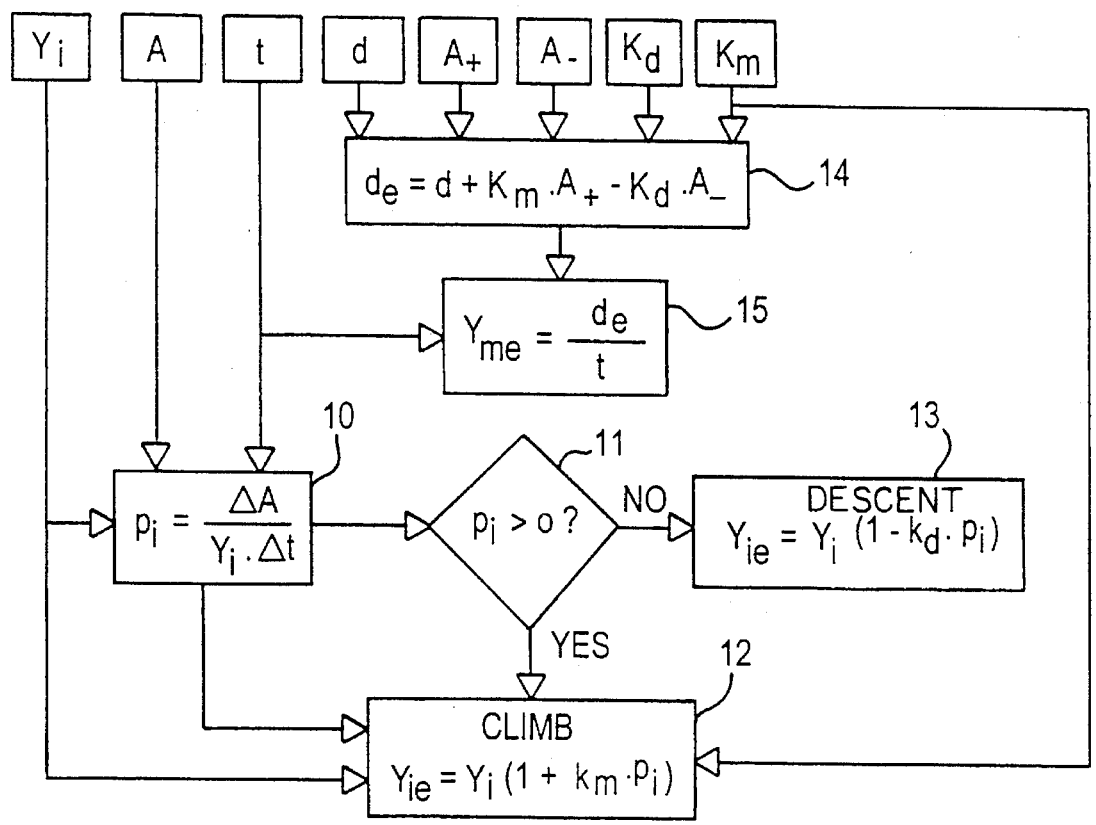
FIG. 1 is a block diagram illustrating the provision of an equivalent instant speed as a function of a positive or negative difference of altitude.

An embodiment of a meter according to the present invention taking into account one external parameter, the positive or negative difference of altitude of the trip, will be first described.

The present invention provides an equivalent instant speed $v_{ie}$ depending upon the slope p and the actual instant speed $v_i$, that can be written:

$$v_{ie}=v_i+k_m \cdot p \cdot v_i \text{ when riding up} \quad (1)$$

or $$v_{ie}=v_i-k_d \cdot p \cdot v_i \text{ when riding down} \quad (2)$$

where $k_m$ and $k_d$ are coefficients which apply to riding up or riding down, respectively, and generally depend upon the slope and the cyclist.

These equations make it possible to fabricate a meter displaying equivalent speeds so that the cyclist can permanently keep his optimum level of effort.

To calibrate this meter, the cyclist first determines his average speed $v_{mp}$ on flat, without wind. This is his average speed on trip achieved with a regular speed for one or several hours (depending on whether he desires to take into account a fatigue coefficient).

1.1 Riding up a Slope

Then, the cyclist determines his equivalence climbing coefficient $k_m$, which depends upon his morphology and his physical power. Coefficient $k_m$ varies with the slope all the more so as the cyclist has less power and is not a good climber because he is then more sensitive to the slope variations. Each cyclist can determine his own curve of coefficients $k_m$. For this purpose, the cyclist measures his instant speed over a relatively long duration for a determined constant slope $p_i$ while trying to make the same effort as he would make during a flat portion of a trip with a speed $v_{mp}$. He calculates the value of his coefficient $k_m$ for this slope from equation (1):

$$k_m(p)=[(v_{mp}/v_i)-1]/p. \quad (3)$$

Basically, coefficients $k_m$ are expressed as a function of the slope by a curve or a table. In the following table 1:

column 1 indicates successive slopes from 0 to 16%, column 2 indicates measured speeds for a determined cyclist making a constant effort, for these different slopes (his equivalent speed on flat being still 30 km/h), and in the last three columns, the instant speed calculated with the following equation from equation (3) is written:

$$v_i=v_{mp}/(1+k_m \cdot p) \quad (4)$$

In column 3, $k_m$=constant=30.

In column 4, $k_m$=20+p.

In column 5, $k_m$=23+p$^{0.9}$.

TABLE 1

| | | $v_i = V_{mp}/(1 + k_{m.p})$ | | |
|---|---|---|---|---|
| p (%) | v (k$_m$/h) | k$_m$ = 30 | km = 20 + p | k$_m$ = 23 + p$^{0.9}$ |
| 0 | 30.0 | 30.0 | 30.0 | 30.0 |
| 1 | 25.0 | 23.1 | 24.8 | 24.2 |
| 2 | 21.0 | 18.8 | 20.8 | 20.0 |
| 3 | 17.0 | 15.8 | 17.8 | 16.9 |
| 4 | 15.0 | 13.6 | 15.3 | 14.6 |
| 5 | 13.0 | 12.0 | 13.3 | 12.7 |
| 6 | 11.0 | 10.7 | 11.7 | 11.2 |
| 7 | 10.0 | 9.7 | 10.4 | 10.0 |
| 8 | 8.8 | 8.8 | 9.3 | 8.9 |
| 9 | 8.0 | 8.1 | 8.3 | 8.1 |
| 10 | 7.3 | 7.5 | 7.5 | 7.3 |
| 11 | 6.7 | 7.0 | 6.8 | 6.7 |
| 12 | 6.2 | 6.5 | 6.2 | 6.1 |
| 13 | 5.7 | 6.1 | 5.7 | 5.7 |
| 14 | 5.4 | 5.8 | 5.2 | 5.2 |
| 15 | 5.0 | 5.5 | 4.8 | 4.9 |
| 16 | 4.7 | 5.2 | 4.4 | 4.5 |

This table shows that it is always possible for a determined cyclist to find out a variation rule for $k_m$ closely approaching his actual variation rule and which, in some cases, can correspond to a constant value of $k_m$.

Thus, a cyclist who knows his average speed on flat, $v_{mp}$, and who desires to elaborate his table of coefficients $k_m$ can either perform tests on various slopes or start from a table existing for a cyclist having similar training and morphology and, in use, more accurately set the values of the table if he notes that he climbs more easily or more difficultly than expected.

1.2 Riding Down

Similarly, when riding down a slope, the equivalent instant speed can be expressed by equation $$v_i = v_{mp}/(1-k_d p) \quad (5)$$

deducted from equation (2). For a given cyclist, coefficient $k_d(p)$ for a determined slope p is determined by measuring speed $v_i$ while riding down this slope: $k_d(p)=(1-vmp/v_i)/p$. For the cyclist considered in the above climbing example, coefficient $k_d$ can be calculated, for example, by equation $k_d$=30.p.0.7.

In addition, during riding down a slope, the possible curves of the road have a major importance; so, additional corrections can be made by taking into account the number of sharp turns for each kilometer covered, when riding down.

1.3 Fabrication of an Equivalent Speed Meter

Once the tables of coefficients $k_m$ and $k_d$ are established for a determined cyclist, they are stored in an electronic meter according to the invention which, like conventional meters, includes a microprocessor and storing means and is associated with sensors for measuring the instant speed $v_i$, altitude A, time t, and distance d.

FIG. 1 represents a simplified block diagram of a meter according to the invention.

In addition to the blocks for detecting and calculating the instant speed $v_i$, the altitude A, the distance d, the positive slope A$_+$, the negative slope A$_-$, this meter includes blocks designated by $k_m$ and $k_d$. Each block $k_m$ and $k_d$ can be a memory providing for each value of the slope the corresponding value of $k_m$ or of $k_d$, or can correspond to calculating means which calculate, from an equation such as those above disclosed and adapted to the cyclist, the value of $k_m$ or $k_d$ for each value of the slope.

A block 10 implements the calculation of the slope $p_i$. A decision block 11 determines whether the slope is positive or negative. If the slope is positive, the equivalent instant speed when riding up is calculated in block 12:

$$v_{ie}=v_i(1+k_m p).$$

If the slope is negative, the equivalent instant speed when riding down is calculated in block 13:

$$v_{ie}=v_i(1-k_d p).$$

In the above example, the various equations are calculated in distinct blocks. In practice, these operations can be carried out by a suitably programmed microprocessor.

One or several calculated values can be displayed at any time. Preferably, the equivalent instant speed $v_{ie}$, which is for the cyclist an essential parameter for the management of his effort, is permanently displayed. In an embodiment of the present invention, the meter further displays an indication on whether the cyclist is beyond or below his normal mean speed on flat. This display may be made by red and green LEDs, by signs + and −, and so As indicated above, an object of the present invention is to provide both an equivalent instant speed indication and an equivalent distance indication. This equivalent distance can be calculated (in a way not shown in FIG. 1) by integrating or by adding the values of the equivalent instant speed. It is also possible, as indicated in block 14, to calculate the instant equivalent distance with the equation:

$$d_e=d+k_m \cdot A_+ -k_d \cdot A_-. \quad (6)$$

The equivalent average speed of the trip, $v_{me}$, can be determined by equation $v_{me}=d_e/t$, as indicated in block 15.

Thus, at any time of his trip, the cyclist can know the equivalent distance covered, i.e., the distance he would have covered if there was no slope.

Also, to prepare a trip, the calculating means included in the meter according to the invention, can be used. Then, the cyclist reads on a map the characteristic features of the trip (distance on flat, altitude differences with various ascending and descending slopes) and calculates the equivalent distance for each portion of the trip from equation (6), then he sums up the total equivalent distance. Since the cyclist knows his average speed on flat, he can thus determine beforehand how long this trip should normally last, including the time duration for covering some specific portions of the trip.

1.4 Updating Coefficients

According to an aspect of the invention, blocks $k_m$ and $k_d$ are programmable from keys associated with the meter.

Figure 2:
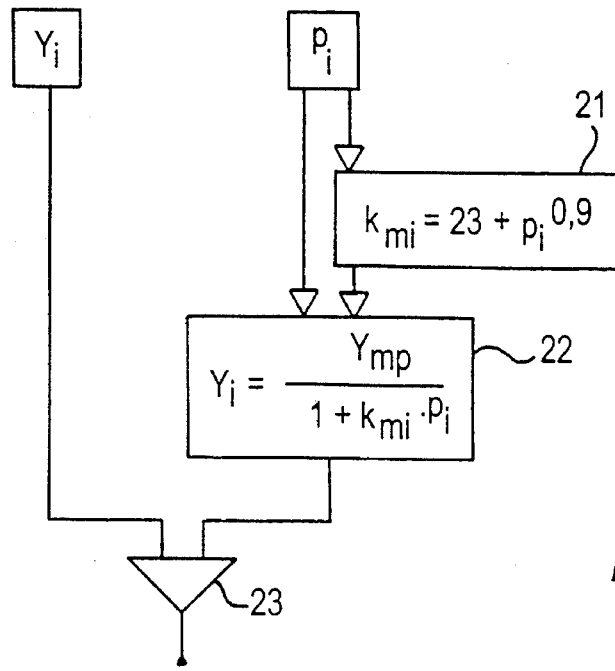
FIG. 2 is a block diagram illustrating the updating of a climbing coefficient for a determined cyclist.

A method for updating the coefficients associated with the slope is illustrated in FIG. 2. FIG. 2 represents sensors for sensing the instant speed $v_i$ and instant slope $p_i$ and a calculation system 21 providing the coefficient $k_{mi}$ corresponding to this slope $p_i$, for example $k_{mi}$=23+pi$^{0.9}$.

In block 22, $v_i$ is calculated from equation (4). The instant speed calculated in block 22 and the measured instant speed are compared in a comparator 23. The output of comparator 23 is, for example, compared with a threshold and, when this threshold is exceeded, the cyclist is informed that, if he is pedaling at a rate that seems to correspond to his normal rate, he should modify his coefficients k. Also, an automatic adjustment system can be provided which modifies one off the parameters for calculating k upon the cyclist's request by actuating a specific key of his meter.

The equivalent instant speed $v_{ie}$ can also be determined from the value $k_{mi}$ obtained by preprogrammation such as $23+pi^{0.9}$: $v_{ie}=v_i(1+k_{mi}p_i)$, which allows the determination of the equivalent distance covered during climbing, which is the sum of the products of the instant speed values by increments of time, and of the value of the average climbing coefficient of the trip $k_m=(d_{em}-d_m)/A_+$.

1.5 Calculating the Slope

Figure 3:
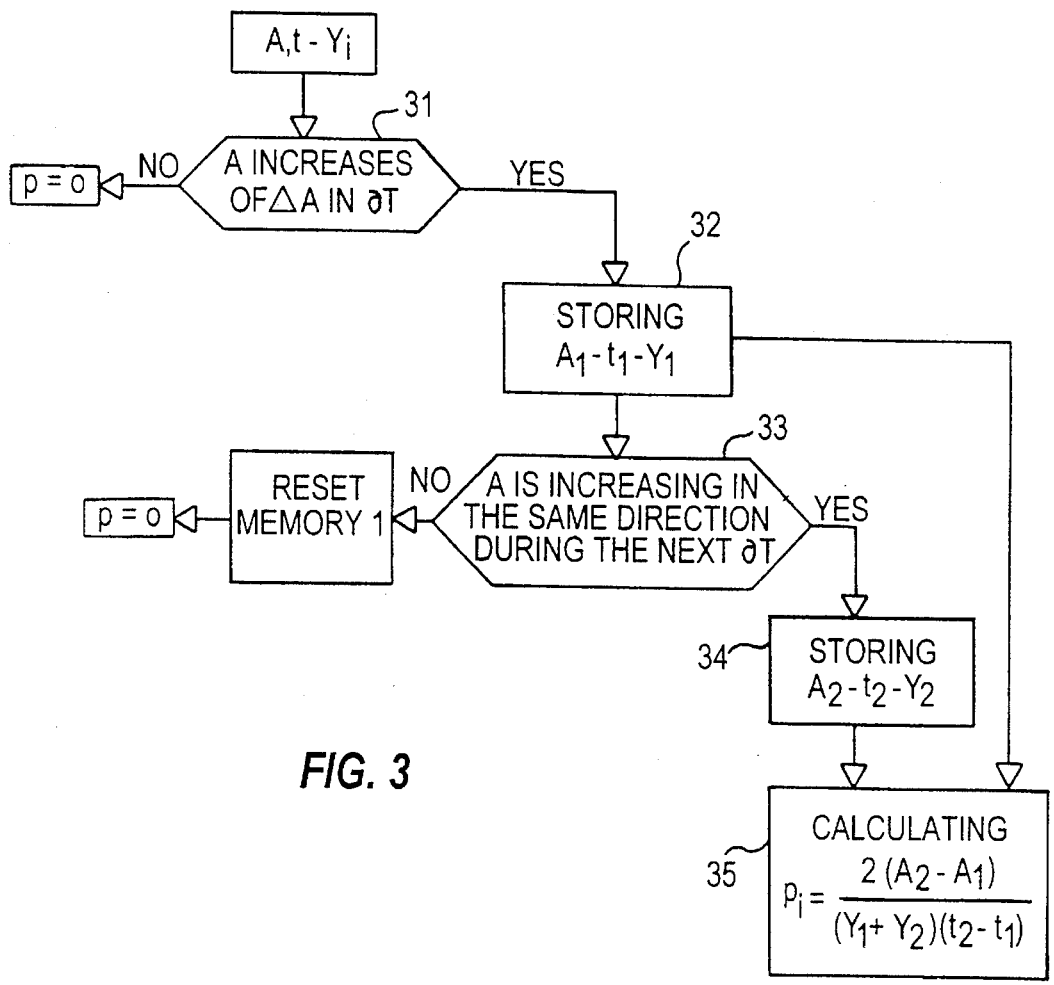
FIG. 3 is a block diagram illustrating the calculation of an instant slope.

To determine the slope, the method illustrated by the block diagram in FIG. 3 can, for example, be used. According to this method, the variations of altitude A are analyzed in block 37. When the altitude value is not incremented by a fixed minimum value ΔA (for example 4 meters), for a determined time interval σT (for example 30 seconds), the slope variation is considered as being zero. Then, as soon as the altitude value is incremented by this fixed minimum value (4 meters) in less than 30 seconds, the altitude value $A_1$ and time $t_1$, at which the value is incremented, as well as the speed $v_1$ at this time are stored (block 32). If, within the next determined time interval (30 seconds), the altitude value is not incremented again (block 33), the system recovers its initial state and the slope is considered as being zero. If the altitude value continues to be incremented in the same direction, as soon as it reaches a value $A_2$ determined from $A_1$ (for example $A_2=A_1+4$ m), the system stores the altitude value $A_2$ and the time value $t_2$ as well as the instant speed $v_2$ at this time (block 34). Then, the calculator calculates the instant slope $$p_i=2(A_2-A_1)/[(v_1+v_2)(t_2-t_1)], \qquad \text{(block 35)}$$

and this value $p_i$ is used in block 10 of FIG. 1.

This method has the advantage of ignoring the non-significant variations of the slope, for example when the slope varies only for a very short time (presence of a bump on the road).

In addition, the device avoids the effects of erratic pressure variations due, for example, to shift of wind. Such pressure variations, taken into account in conventional meters, provide erroneous calculations of the altitude difference. The meter, according to the present invention, eliminates the effects of any abrupt pressure variation providing a slope incompatible with the speed and the specific coefficients of the cyclist. This incompatibility is expressed, for example, by a range of limit values of the equivalent speed as a function of the slope and of the specific coefficients of the cyclist.

Various conventional pressure sensors can be used for measuring the difference in altitude.

Instead of the above-described system, a device formed, for example, by sensors associated with the level of a liquid partially filling elements included in the bicycle's frame can be used for directly measuring the slope.

1.6 Alternative Embodiments

The meter according to the invention can, like conventional meters, achieves and displays various measurements, mean values, cumulated values, and so on.

In addition, the slope determined by the meter can be used to display the optimum gear (chain wheel and gear ratio) to select. A correspondence table can be arbitrarily established and stored in the meter. However, the correspondence table is preferably introduced by the user himself, or can be arbitrarily introduced and then means are provided for updating the table. Since present systems for changing the gear ratio and/or the chain wheel with electric control means are known, the information provided by the meter can be used for automatically changing the gear.

According to a further improvement, the invention provides for calculating and for displaying upon request a performance index corresponding to the ratio between the equivalent speed and the average speed on flat or to another function of those two values.

According to a further improvement, the invention provides for calculating and for displaying upon request a fitness index F. For this purpose, indications upon the instant heart rate $N_i$ of the user (whose normal rate is $N_0$) are provided to the meter and, for example, the equation $F=v_{ie} N_0/v_{mp} N_i$, is calculated. Normally, F=1. A value lower than 1 indicates that the cyclist is tired and prompts him to reduce his effort. A value higher than 1 indicates fitness of the cyclist and prompts him to increase his effort. Instead of displaying this fitness index, the meter can merely indicate whether the cyclist is outside of a determined range.

2. Other Parameters

In the above disclosure, it has been assumed that the parameter that may affect the performances of the cyclist is the altitude variation. Of course, other parameters may affect the cyclist's trip, such as wind, braking, and so on.

2.1 Wind

If $v_v$ designates the axial component, positive or negative, of the wind in the direction of the trip of the cyclist, an equivalent speed in the presence of wind $v_{ie}=v_i+f(v_v)$ can be determined. Of course, a sensor measuring the wind speed and disposed on the bicycle will determine the difference between the real wind speed and the cyclist speed. The corresponding calculations are easily achieved by a microprocessor circuit.

With a front wind, the equation $f(v_v)=v_v^{0.96}$ provides a satisfactory result.

As in the case of slopes, a coefficient $k_v$ associated with wind can be determined so that the equivalent distance $d_{ev}$ is expressed with relation to the actual distance with equation $d_{ev}=k_v d$. This coefficient $k_v$ is written, in the case of the above example and in the presence of a front wind: $k_v=1/[(v_{mp}/v_v^{0.96})-1]$.

2.2 Braking

Braking during a trip requires additional energy from the cyclist to allow him to recover his normal average speed. Thus, braking affects an accurate evaluation of the equivalent distance and can be detected by a sensor provided in the brake handgrip of the bicycle.

2.3 Presence of Several Parameters

When several parameters simultaneously interfere, for example wind and slope, they can be taken into account by combining the above-mentioned calculations.

3. Exemplary Embodiments

Figure 4A:
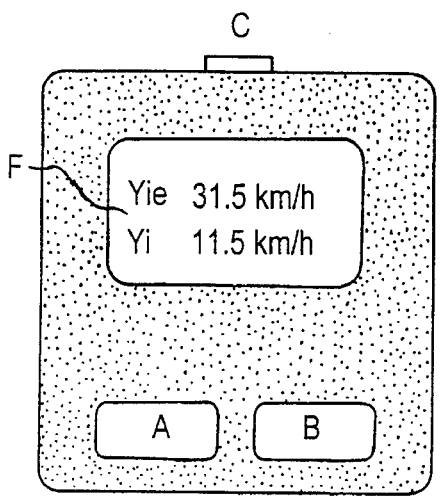
FIGS. 4A–4E illustrate an exemplary embodiment of a meter according to the invention.

FIG. 4A represents, by way of example, the front panel of a meter according to the invention. The meter includes, for example, a display window F and three control keys A, B and C. Conventionally, the meter includes a microprocessor which is programmed so that parameters can be introduced, or either one among several measured and calculated values can be displayed depending upon the keys that are activated.

Many methods are known to provide keys for controlling the various functions of a microprocessor. By way of example, key B can initially be an OFF/ON key, for turning on the meter, and displaying the instant speed $v_i$ and the equivalent instant speed $v_{ie}$ in the display window. Key A can be a key for selecting the mode of operation to modify the data displayed in the window F. Either one of displays of FIGS. 4A–4E can, for example, be obtained.

The display of FIG. 4A indicates the equivalent instant speed $v_{ie}$ and the instant speed $v_i$.

Figure 4B:
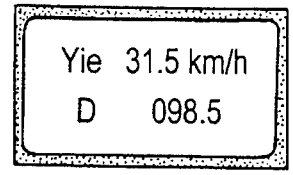

The display of FIG. 4B indicates the equivalent instant speed $v_{ie}$ and the distance D covered from the turning on of the meter.

Figure 4C:
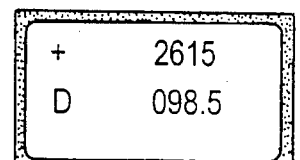

The display of FIG. 4C indicates the distance: "2615" (miles or Km) corresponds to the cumulated total of the meter from the time it was turned on, and the distance D=98.5 (miles or Km) corresponds to the distance covered from the beginning of the considered trip. Sign + indicates that the cyclist is beyond his average speed.

Figure 4D:
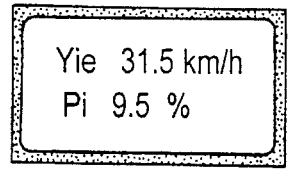

The equivalent instant speed $v_{ie}$ and the instant slope $p_i$ are displayed in FIG. 4D.

Figure 4E:
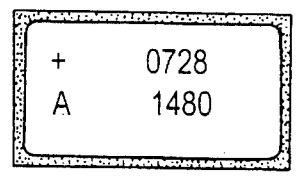

In FIG. 4E are displayed altitude values: "0728" indicates the altitude expressed in meters, and value A=1480 meters indicates the sum of the positive slopes covered by the cyclist from the beginning of his trip. Sign + indicates that the equivalent instant speed is higher than the average speed on flat of the cyclist.

Of course, the foregoing displays are only exemplary and are not intended to be limiting.

Key C sets the meter in programmation mode, the programmation being then achieved by acting alternatively on keys A and B.

According to an aspect of the invention, key C is programmed so that, when the meter operates, i.e., when the calculated instant speed is higher than a disconnection threshold, a pulse on key C causes the present data in the meter to be stored, and especially the covered distance, the altitude and the time duration. Thus, when a cyclist has finished his trip, he can refer to data of key points of his trip, for example, to establish statistics on his performances.

In addition, the meter according to the invention can include various means for calculating and displaying the various indicated values or their global or partial sums and their total or partial average values. It is also possible to take into account other parameters than those specifically mentioned and to provide the meter with various equipments such as a memory saving device with a double battery box and a charge indicator.

The invention, by taking into account the energy needed to overcome various forces opposed to the movement of the person, thus determines performance indications such as the equivalent speed, the equivalent distance, a performance ratio, and so on.

The invention determines further performance indicators, such as the useful power which represents the power needed to overcome the forces opposed to the movement. A conventional meter measuring the power produced by the person (or the applied torque and the rate) cannot differentiate the useful portion of this power (which serves to achieve the performance) from the useless portion which, for example, for a cyclist, is caused by a wrong manner to pedal, by the weight of his leg on the rising pedal, a wrong position on the bicycle, and so on.

To determine these performance indicators, the rough data characterizing the movement (such as the speed or the produced power) are corrected by coefficients associated with parameters of the trip (difference of altitude, wind..) which generate forces external to the person, opposed to the movement of the person and, accordingly, which affect the effort necessary to the movement.

The invention further allows the user to personalize his coefficients by calibrating his performance meter as a function of his own usual average performance or of the usual average performance of the group of persons with respect to which he desires to compare his performance.

Last, as indicated in the preamble, this meter applies to moving devices other than bicycles, for example, rowing boats. The parameters to be taken into account will then be, for example, the flow, waves, wind . . . This meter can also be an element of a pedometer; then, the main parameters to take into account are the slope and wind.

What is claimed is:

1. A method for measuring and managing efforts of a person moving under muscular energy, including the following steps:

establishing for each parameter of movement a correspondence between instant speed of the movement and equivalent speed that would be reached if the parameter was at a rest value and the same efforts were made;

measuring the instant speed and a value of the parameter; and providing for each instant speed the equivalent speed in accordance with the established correspondence.

2. A meter for measuring performance of a person moving using muscular energy, including:

means for measuring data characterizing the movement;

means for determining, directly or indirectly, at least one parameter affecting an effort to move;

means for providing coefficients associated with a value of said parameter; and means taking into account said coefficients for providing a performance indication corresponding to a value that would be reached by said characterizing data for the same effort when the parameter has a rest value.

3. The meter of claim 2, wherein said coefficients are also specific to the person.

4. The meter of claim 2, wherein said characterizing data is speed and said performance is an equivalent speed.

5. The meter of claim 4, including:

means for introducing normal average speed for rest values of said at least one parameter;

means for storing or calculating coefficient values as a function of variations of said parameter; and means for calculating the equivalent speed taking in account said coefficient values.

6. The meter of claim 4, including means for calculating a performance index taking into account equivalent instant speed and the average speed for the rest value of said at least one parameter.

7. The meter of claim 4, wherein said measuring means comprises a sensor for measuring heart rate including means for calculating and displaying a fitness index F calculated as a function of equivalent instant speed and of the detected heart rate, for example:

$F = v_{ie} N_0 / v_{mp} N_i$, where:

$v_{ie}$ is the equivalent instant speed, $v_{mp}$ is the average speed on flat, $N_0$ is the detected heart rate for a normal effort on flat, and $N_i$ is the detected heart rate.

8. The meter of claim 4, wherein said parameter is slope, further comprising means for inhibiting the effect of altitude variations when those variations provide slope values that are not compatible with the person's speed and coefficients.

9. The meter of claim 4, wherein said parameter is wind.

10. The meter of claim 2, wherein the performance of a cyclist is determined.

11. The meter of claim 6, wherein said parameter is slope, and equivalent speed is determined by an equation:

$v_{ie} = v_i(1 + k_m p)$ or $v_{ie} = v_i(1 - k_d p)$, where $v_{ie}$ is equivalent instant speed, $v_i$ is the instant speed, p is the slope, $k_m$ is a coefficient depending upon the slope and the cyclist for a positive slope, $k_d$ is a coefficient depending upon the slope and the cyclist for a negative slope.

12. The meter of claim 10, including means for selecting advised gear and displaying optimum rate, and for automatically controlling an electrically-controlled gear changing device.

13. The meter of claim 2, including means for calculating equivalent trip distance.

* * * * *